US012560962B2

(12) United States Patent
Chase

(10) Patent No.: US 12,560,962 B2
(45) Date of Patent: Feb. 24, 2026

(54) LAPTOP CASE WITH FOLDABLE SHADE ASSEMBLY

(71) Applicant: Ryan John Chase, Los Angeles, CA (US)

(72) Inventor: Ryan John Chase, Los Angeles, CA (US)

(73) Assignee: Anywhere LLC, Denver, CO (US)

( * ) Notice: Subject to any disclaimer, the term of this patent is extended or adjusted under 35 U.S.C. 154(b) by 0 days.

(21) Appl. No.: 19/040,830

(22) Filed: Jan. 29, 2025

(65) Prior Publication Data

US 2025/0224765 A1 Jul. 10, 2025

Related U.S. Application Data

(63) Continuation-in-part of application No. 18/402,617, filed on Jan. 2, 2024.

(51) Int. Cl.
*G06F 1/16* (2006.01)

(52) U.S. Cl.
CPC .......... *G06F 1/1629* (2025.01); *G06F 1/1603* (2013.01)

(58) Field of Classification Search
CPC .............................. G06F 1/1629; G06F 1/1603
See application file for complete search history.

(56) References Cited

U.S. PATENT DOCUMENTS 5,325,970 A * 7/1994 Dillon ................... G06F 1/1628
312/208.3
5,717,566 A * 2/1998 Tao ....................... G06F 1/1603
359/601

7,303,077 B2 12/2007 Harlocker
11,332,954 B1 * 5/2022 Chase ..................... E04H 15/58
11,846,982 B1 12/2023 Chase
2003/0223119 A1 * 12/2003 Heiman ................... A45C 3/02
359/601

(Continued)

OTHER PUBLICATIONS

The parent application is U.S. Appl. No. 18/402,617, filed Jan. 2, 2024, from which this continuation-in-part application claims priority International Search Report and Written Opinion pertaining to PCT/US2024/010224, mailed Mar. 19, 2024.

*Primary Examiner* — Allen L Parker
*Assistant Examiner* — Keon Nmn Kim
(74) *Attorney, Agent, or Firm* — Armon Shahdadi, Pierson Ferdinand LLP

(57) ABSTRACT

A clamshell-style laptop case with a foldable shade assembly that, when expanded, shades and protects a laptop that's placed within the opened case. A shade assembly, positioned within the interior of the clamshell case, includes a visor panel, side panels, a rear panel, and lower panel. When the case is opened, the shade assembly can be expanded from its collapsed position by lifting the visor panel upward as it rotates along a hinge connecting it to the rear panel, while the side panels simultaneously expand from a folded position. The side panels remain permanently attached to the shade assembly, reducing the steps required to expand and collapse the shade assembly. The shade assembly may incorporate a friction hinge connecting the shade assembly's lower panel and rear panel which enables the rear panel to rotate greater than 90 degrees to the lower panel, providing improved functionality and accessibility during use.

20 Claims, 14 Drawing Sheets

(56)  References Cited

U.S. PATENT DOCUMENTS

| | | | | |
|---|---|---|---|---|
| 2005/0205444 A1* | 9/2005 | Harlocker | ............ | A45C 11/003 |
| | | | | 206/320 |
| 2006/0042971 A1* | 3/2006 | Holmes | ................. | A45D 33/22 |
| | | | | 206/235 |
| 2006/0226040 A1* | 10/2006 | Medina | ................. | G06F 1/1616 |
| | | | | 361/679.55 |
| 2009/0013573 A1* | 1/2009 | Krinke | .................... | G09F 21/04 |
| | | | | 40/606.01 |
| 2009/0032421 A1* | 2/2009 | Sween | .................... | A45C 3/02 |
| | | | | 206/320 |
| 2011/0011759 A1 | 1/2011 | Luo | | |
| 2011/0134534 A1* | 6/2011 | Luo | ....................... | G06F 1/1603 |
| | | | | 359/601 |
| 2016/0087469 A1* | 3/2016 | Armstrong | ............ | A45C 11/00 |
| | | | | 320/107 |
| 2016/0088752 A1* | 3/2016 | Zaccaria | ............. | H04B 1/3888 |
| | | | | 359/601 |
| 2020/0033918 A1* | 1/2020 | Akalou | ................. | G06F 1/1603 |
| 2021/0197728 A1* | 7/2021 | Brown | ................... | B60K 35/60 |
| 2023/0404242 A1* | 12/2023 | Waggoner | ................ | A45F 3/04 |
| 2024/0393826 A1* | 11/2024 | Hewett | ............... | A45C 11/003 |

* cited by examiner

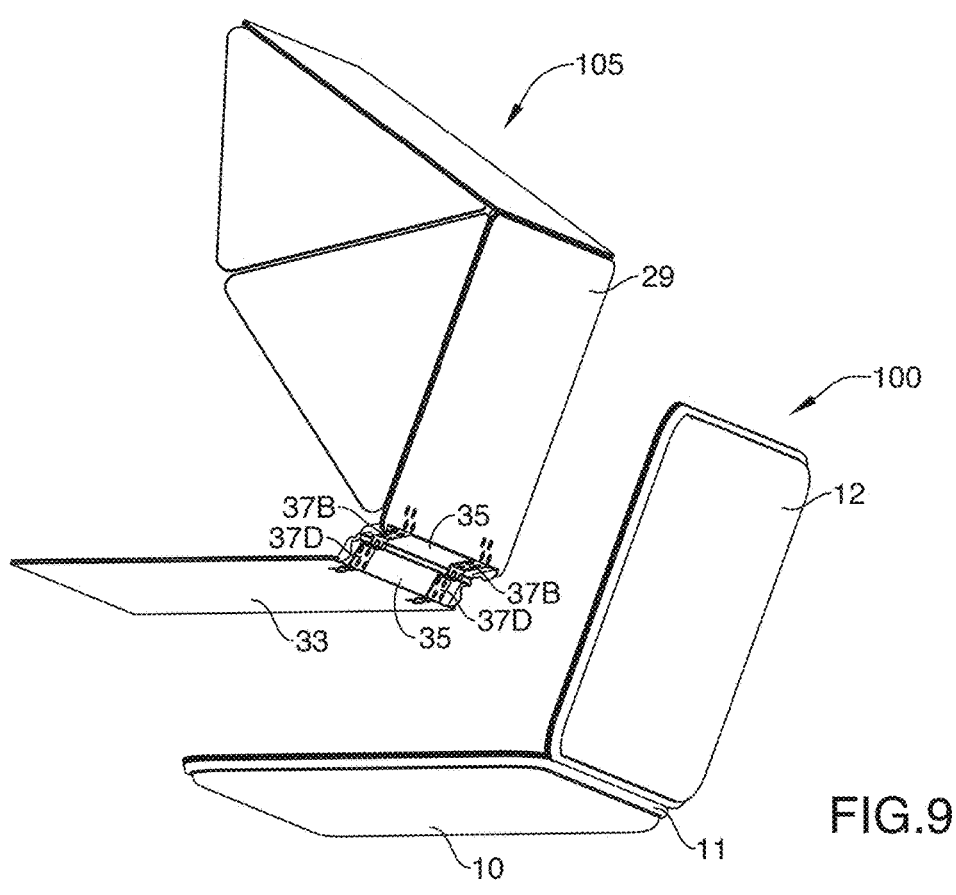
FIG.9
FIG.10A
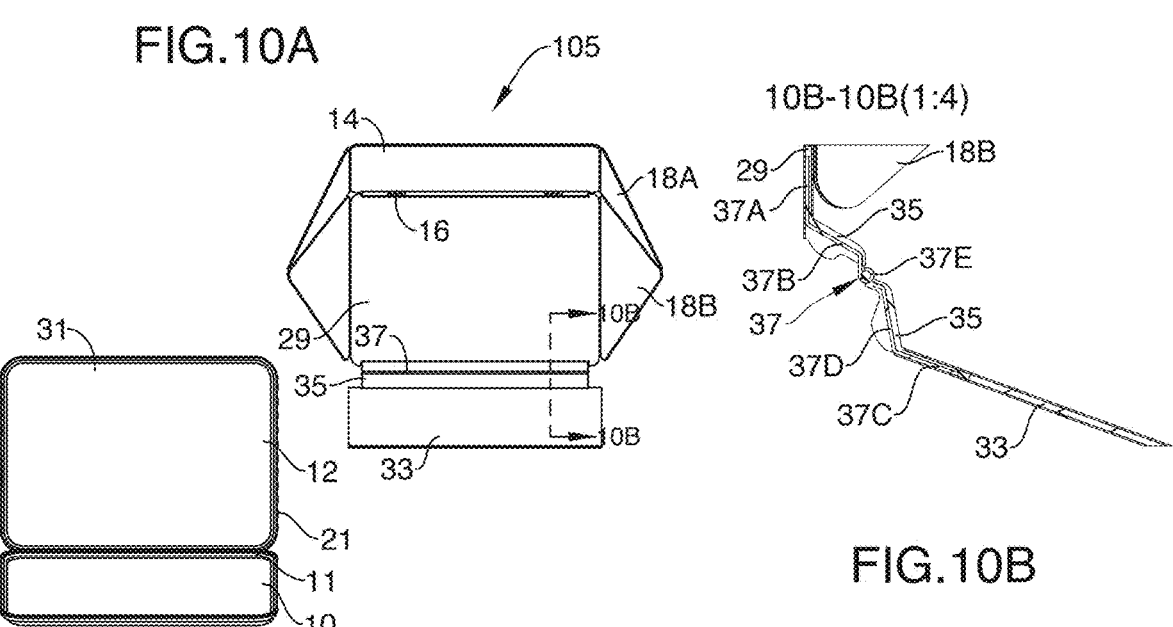
10B-10B(1:4)
FIG.10B

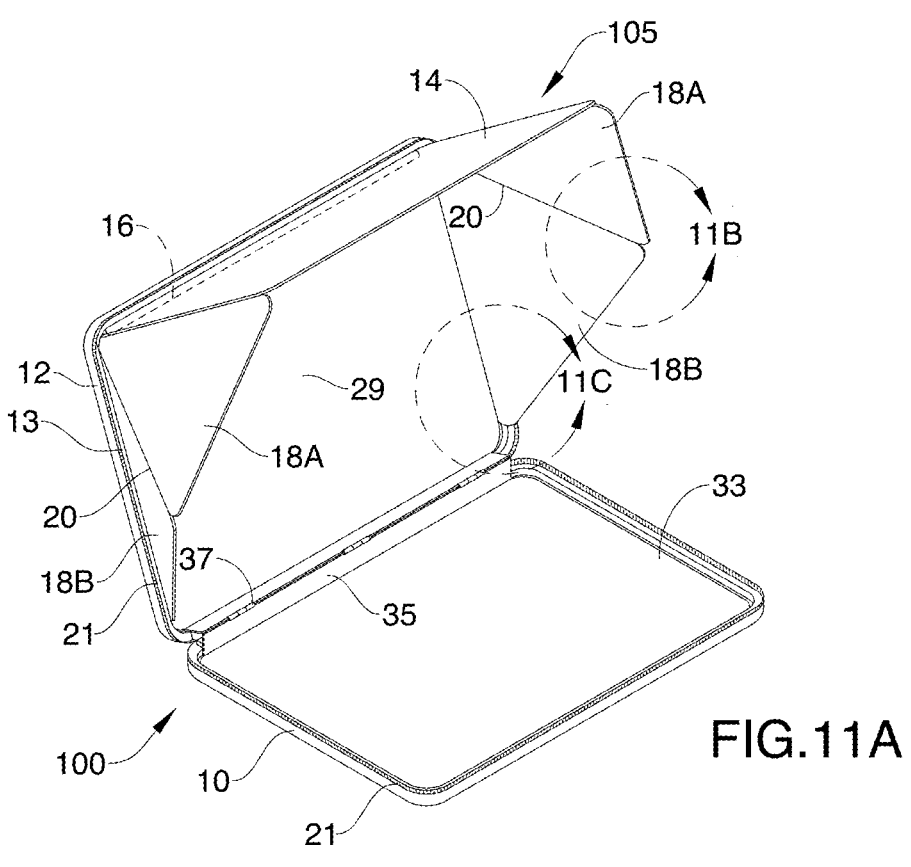
FIG.11A
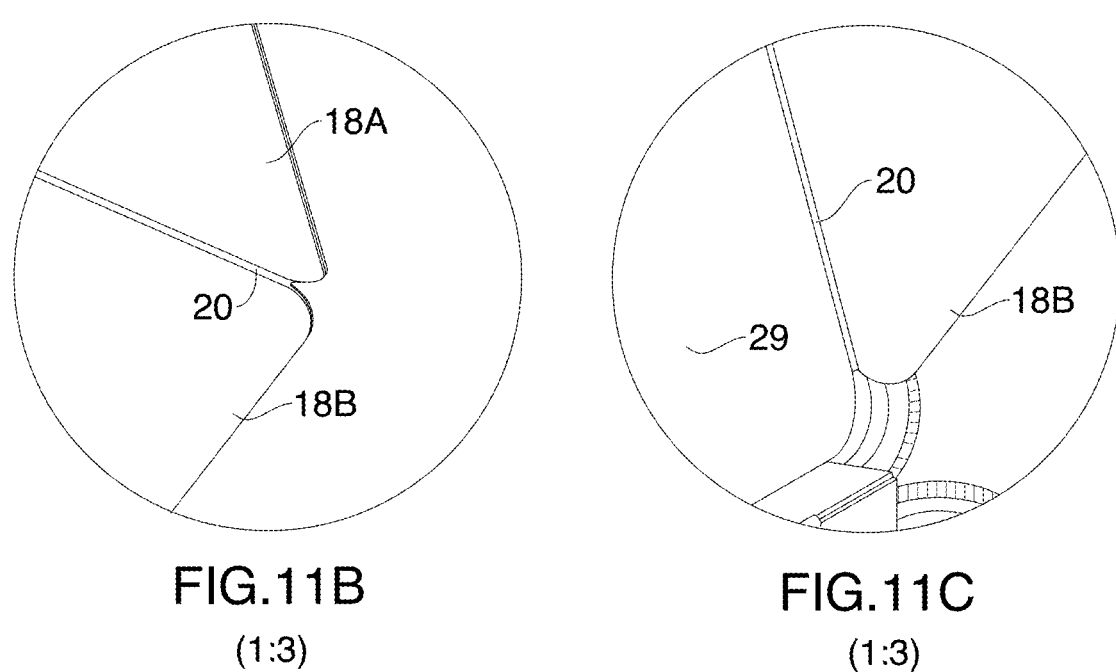
FIG.11B
(1:3)
FIG.11C
(1:3)

LAPTOP CASE WITH FOLDABLE SHADE ASSEMBLY

CROSS-REFERENCE TO RELATED APPLICATIONS

This is a continuation-in-part of U.S. application Ser. No. 18/402,617, filed 2024 Jan. 2, with title "Laptop Case With Foldable Shade" by the present inventor, the entire content of which is hereby incorporated herein by reference.

BACKGROUND OF THE INVENTION

The compact, portable nature of laptops allows for their use almost anywhere, but when being used outdoors or near a window, sunlight can cause an obstructive glare on the monitor and/or cause the laptop to overheat, limiting their otherwise universal usability to indoor or shaded environments.

Laptop cases can keep sunlight off the body of a laptop when the laptop is enclosed in with a case in its closed configuration; however, current commercially available laptop cases do not provide a collapsable visor and side panels attached to the lid of the case which, when expanded, can partially shield the monitor and keyboard components of a laptop placed within the opened case from direct sun exposure. This forces users to improvise using makeshift shades which tend to lack a secure attachment to a laptop case, and which are not specifically designed to be folded flat and be stored in the interior of a laptop case when not in use.

Thus, there is a need for a laptop case with a foldable shade assembly which to shade a laptop from unwanted light or sunlight, thereby reducing glare and preventing the laptop from overheating when being used in direct sunlight, and wherein the shade assembly can be folded flat for convenient storage along the interior surface of the laptop case.

A small number of laptop cases with shade features have been proposed—for example, US patents 20050205444 (2007) to Harlocker et al., U.S. Pat. No. 5,325,970 (1994) to Dillon et al., and publication 2003/0223119 (2003) to Heiman et al., however these suffer from a number of disadvantages:

The prior art teaches that the case lid, when opened, does not extend beyond 90-degrees or "generally normal" to the base, which limits (1.) the range of motion that the monitor of a laptop placed within the case can open to and (2.) the viewing angle that can be accommodated when a laptop is placed within the case during use.

The prior art teaches side panels that are loose and move freely on the opposite end of the visor panel. This requires the user to perform overcomplicated configuration steps to swing each panel downward from the visor panel and secure it vertically with the base of the laptop case when transitioning the shade mechanism from a collapsed configuration to an expanded configuration. Similarly, the prior art requires the reverse set of manual configuration steps when preparing the side panels to transition from an expanded configuration to a collapsed configuration.

The prior art teaches the visor panel being directly connected to the lid of the case which limits the variety of materials that can be used for the case construction. For example, having the visor panel connect directly to the lid of the case necessitates the lid of the case be manufactured from a rigid material in order to provide adequate structure to attach the visor panel and provide enough support to maintain the position of the visor and side panels. Having the visor panel and side panels connected directly to the lid of the case limits the use of potential materials for the case lid that might provide additional advantages, and also limits the methods of manufacturing and assembling the device which can be used.

The prior art teaches that the weight of the visor be supported by the side panels that rest on the base. This limits the usability by restricting the lid's range of motion relative to the base to a fixed angle or angles since the side panels must remain in contact with the base in order to support the weight of the visor, the lid—being directly connected to the visor—cannot extend backward beyond this fixed position.

The prior art teaches variations of features that are intended to ensure a complete enclosing around 5 sides of the laptop to prevent undesired viewers from seeing the screen. These features are intended for providing privacy which is a motivation the prior art references share. For example, to optimize for privacy, the prior art references teach various rudimentary ways of attaching the side panels to a case base and creating a complete enclosure for a laptop around 5 sides, leaving a 6th side open for the user to view a laptop. This limits the usability of these devices at varying viewing angles where the lid is greater than 90 degrees to the base since the angle of the lid to the base depends on maintaining this connection of the side panels to the base.

Additional novel features are described in detail in the summary and detailed description sections.

Furthermore, there is a need for improved structural components that can provide the support to maintain the weight and position of a visor, and which allows the structural components that can be decoupled from the case lid, providing more variety in terms of materials that can be used and additional manufacturing and assembly advantages.

Furthermore, there is a need for additional functionality for working remotely that can be included with the laptop case and foldable shade assembly, including a built-in battery into the case for extended laptop usage in remote locations when outlets are not available to provide a power source, and the ability to connect the case to a tripod or four-legged stand.

There is also a need for a laptop case and foldable shade assembly wherein the shade assembly is removably attachable and can be detached and replaced with another shade assembly for interoperability.

SUMMARY OF THE INVENTION

The present invention relates to laptop accessories, primarily a laptop case with a built-in, foldable shade assembly that, when expanded, shades and shields a laptop that's placed within the opened case from direct sun exposure.

The laptop case is a clamshell style case comprising two halves: a lid and a base, joined together along their adjacent rear edge by a hinge which allows the lid and base to pivot relative to each other, to transition between an open configuration for use and a closed configuration for storage or transport.

The built-in shade assembly consists of at least a visor panel, and an upper and lower side panel on each side of the shade assembly. The visor panel and upper and lower side panels serve as the primary shading elements to shield a laptop from direct sunlight.

When the case is in its open configuration, the shade assembly can be expanded from its collapsed position by lifting upward on the front edge of the visor panel and rotating it about an upper hinge. As the visor panel of the shade assembly is lifted and extended outward over the base of the case, the upper and lower side panels on the left and right side of the shade assembly are simultaneously expanded in order to maximize coverage over a laptop contained within the open case, providing an awning-like or hooded structure that shields the laptop from sunlight.

When collapsing the shade assembly, the visor panel folds in a downward rotation by lowering the front end of the visor panel while the side panels simultaneously fold inward in a flattened position. In the collapsed position, the collapsed shade assembly lays flat along an interior planar surface of the lid portion of the case.

In one embodiment of the present invention, the shade assembly includes a visor panel and an upper side panel and lower side panel on each side of the shade assembly. The upper side panels are permanently attached to the visor panel on each of the left and right sides, and the lower side panels are permanently attached to the case lid on each of the left and right sides.

In some embodiments of the present invention, the shade assembly includes a visor panel, an upper side panel and lower side panel on each side, as well as a rear panel and a bottom panel which are unique to this embodiment. The visor panel may be pivotally connected to the rear panel via a hinge. The upper side panels are permanently attached to the visor panel on each the left and right sides, while the lower side panels are permanently attached to the rear panel on each the left and right sides. In this configuration, the visor panel and lower side panels are attached to the rear panel of the shade assembly rather than being directly attached to the case lid. The rear panel may be pivotally connected to the bottom panel via a lower hinge. The bottom panel is configured within the interior surface of the case base, while the rear panel is configured within the interior surface of the case lid. In this embodiment, the angle of the lid to the base can match the angle of the rear panel to the lower panel, and is defined by the lower hinge of the shade assembly, which may be a friction hinge or any other suitable hinge. This embodiment provides a number of advantages including more variety in terms of the materials which can be used for various components as well as more options in the manufacturing and assembly processes. In this embodiment, because the shade assembly comprises of a rear panel and lower panel in addition to the visor panel and side panels, it decouples the lid of the case from having to also possess materials required to provide a rigid and structurally supportive framework for supporting the weight of the visor and side panels, thereby providing a variety of advantages with respect to different materials that can be utilized for the case. As a result, the lid and base clamshell case may be constructed of but not limited to EVA foam or TPU which provides a lightweight, flexible, and durable option, while the shade assembly structure can be constructed of rigid panels to support the weight of the visor panel and side panels. Additionally in this embodiment, the shade assembly can be manufactured separately from the clamshell case and assembled together afterward, providing added manufacturing advantages such as additional options for manufacturing processes and techniques.

No other laptop cases with shade assemblies teach a clamshell style case that also have a foldable shade assembly wherein the shade assembly can be folded flat and securely stored vertically within the lid of the case while the lower side panels maintain a permanent connection to the lid of the case.

No other clamshell style case solutions comprise a foldable shade assembly with a visor panel and two side panels on each side of the case which fold inward along a center hinge that connects the two side panels in order for the shade assembly to fold within the interior planar surface of the lid. This unique functionality allows the side panels of the shade assembly to fold and stored in a novel fashion.

No other laptop cases with shade assemblies teach a shade assembly comprising a visor panel and side panels that are connected to a rear panel, and wherein the rear panel is attached to a bottom panel via a hinge, and wherein the rear panel and lower panel can be configured inside the interior surface of the base of the case.

Similarly, no other products teach a clamshell style laptop case wherein the shade assembly comprises a rear panel connected to a lower panel with a hinge, which may include a friction hinge which allows the case rear panel to extend beyond 90-degrees to the lower panel to improve the usability and range of view, as well as provide additional manufacturing and assembly benefits as described in detail in the summary section.

No other products teach a clamshell style laptop case wherein the lid and the base are connected via a rear hinge, which may include a friction hinge which allows the case lid to extend beyond 90-degrees to the base.

No other products teach a clamshell style case wherein the shade assembly can be detached and replaced with another shade for interoperability.

No other products contain a recess along the bottom of the base of the case whereby the case can be mounted to a mounting plate with connection components for a tripod or four-legged stand to create a portable or mobile desk experience.

No other laptop case and shade systems further comprise an area in the base of the case configured to house a battery, with a charging port interface on the exterior of the case that provides a connection point for a battery placed within the area.

No other laptop case and shade systems further include side gussets to maximize the amount of sun coverage.

BRIEF DESCRIPTION OF THE DRAWINGS

FIG. 9 is an exploded view of the same embodiment of the present invention as shown in FIGS. 7 and 8 wherein the shade assembly is shown outside of the clamshell case from a rear side angle. The lower hinges that connect the rear panel and the bottom panel are visible.

FIG. 10A is an exploded view of the same embodiment of the present invention as shown in FIGS. 7-9 wherein the shade assembly is shown outside of the clamshell case from a frontal view with a dashed line indicating a section view of the lower hinge mechanism that connects the rear panel and the bottom panel of the shade assembly.

FIG. 10B is a section view of FIG. 10A showing an embodiment of the present invention wherein the hinge plate on the bottom of the hinge that connects the rear panel to the bottom panel of the shade assembly is shown sandwiched within two sheets of material which form the bottom panel. Similarly, the hinge plate on the top of the hinge that connects the rear panel to the bottom panel of the shade assembly is shown sandwiched within two sheets of material which form the rear panel. The material may be but not limited to thin sheets of FR4 or PCB Board.

FIG. 11A is a perspective view of an embodiment of the present invention, showing the clamshell case in an open configuration where the angle defined by the case lid and the base is greater than 90 degrees. The shade assembly is expanded within the interior of the clamshell case. Dashed circles define the boundaries for the enlarged views of FIGS. 11B and 11C.

FIG. 11B is an enlarged view of an embodiment of the present invention showing a joining hinge connecting the upper side panel and lower side panel as a living hinge wherein the panels are laminated with materials that bond together in the space between the panels, creating a flexible, durable living hinge.

FIG. 11C is an enlarged view of an embodiment of the present invention showing a joining hinge connecting the lower side panel to the rear panel of the shade assembly. In this view, the panels are laminated with materials that bond together in the space between the panels, creating a flexible, durable living hinge.

DETAILED DESCRIPTION OF THE INVENTION

Figure 1:
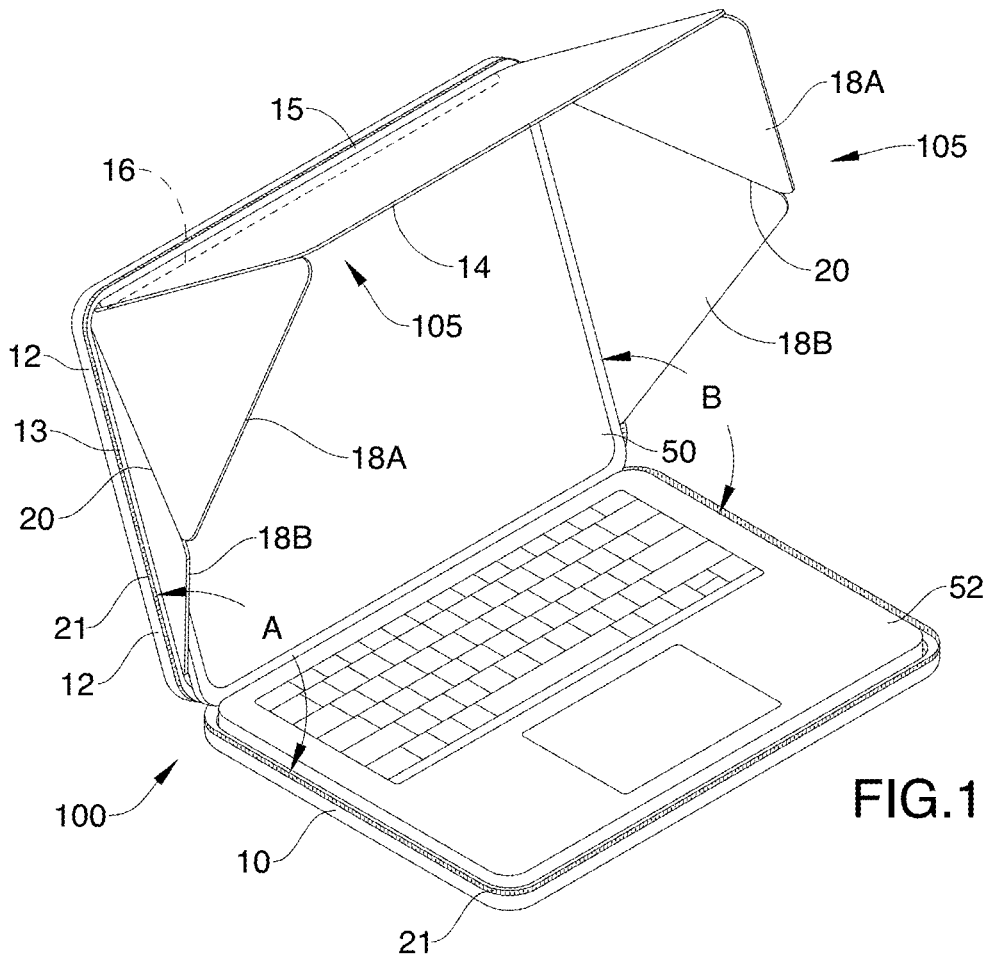
FIG. 1 is a perspective view of an embodiment of the present invention, showing the clamshell case in an open configuration where the angle defined by the case lid and the base is greater than 90 degrees. The shade assembly is expanded, with an opened laptop placed within the case where the monitor is at an angle greater than 90-degrees to the keyboard, matching the angle of the case lid to the base.

The following detailed description is of currently contemplated modes of carrying out exemplary embodiments of the invention. The description is not to be taken in a limiting sense but is made merely for the purpose of illustrating the general principles of the invention, since the scope of the invention is best defined by the appended claims.

The present invention discloses a clamshell-style laptop case 100 with a foldable shade assembly 105 that, when expanded, partially shades and shields a laptop placed within the opened case from direct sun exposure.

A laptop 22 is a portable computer with a monitor 50 on the upper half and a keyboard 52 on the lower half, which are connected via a hinge. The hinge allows the monitor 50 to open at various angles, typically 90 degrees or more, enabling it to be positioned at the desired angles for use between a closed and open configuration.

The laptop case 100 can be a clamshell laptop case comprising two halves—a lid 12 and a base 10—joined together along their adjacent rear edge via a rear hinge 11 which allows the lid and base to pivot relative to each other, to transition between an open configuration for use and a closed configuration for storage or transport. The rear hinge 11 joining the case lid and base may be, but is not limited to, a fabric hinge (for example, a living hinge), or a mechanical hinge (for example, a piano hinge, or friction hinge). The rear hinge 11 connecting the lid and the base can allow the lid 12 to extend greater than 90-degrees to the base 10 when fully opened as indicated with Angle A in FIGS. 1-2.

The lid 12 and base 10 of the case 100 each include a left edge 13, a right edge 17, and a front edge 15, with the front edge 15 positioned opposite the rear hinge 11 connecting the lid 12 and the base 10.

Figures 4, 5, 6:
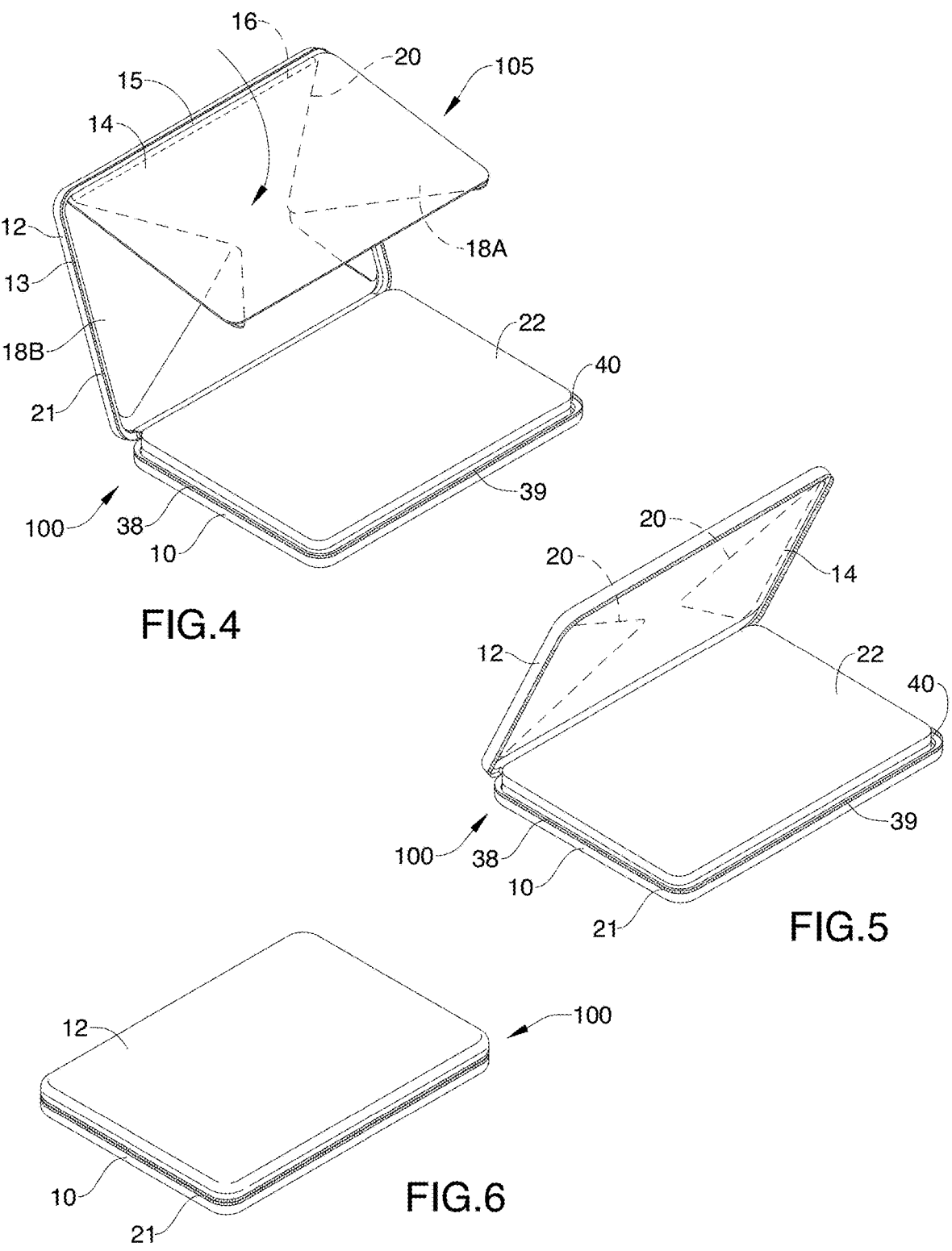
FIG. 4 is a perspective view of an embodiment of the present invention, with the clamshell case shown in an open configuration and the shade assembly in a partially collapsed state, where the side panels on the left and right sides are collapsing inward while the visor panel is being rotated downward about it's upper hinge. A laptop is fully closed within the case.
FIG. 5 is a perspective view of an embodiment of the present invention, with the clamshell case shown in an open configuration and with the shade assembly folded in its collapsed state. A laptop is fully closed within the case.
FIG. 6 is a perspective view of an embodiment of the present invention, with the clamshell case shown in a closed configuration.
Figures 7, 8:
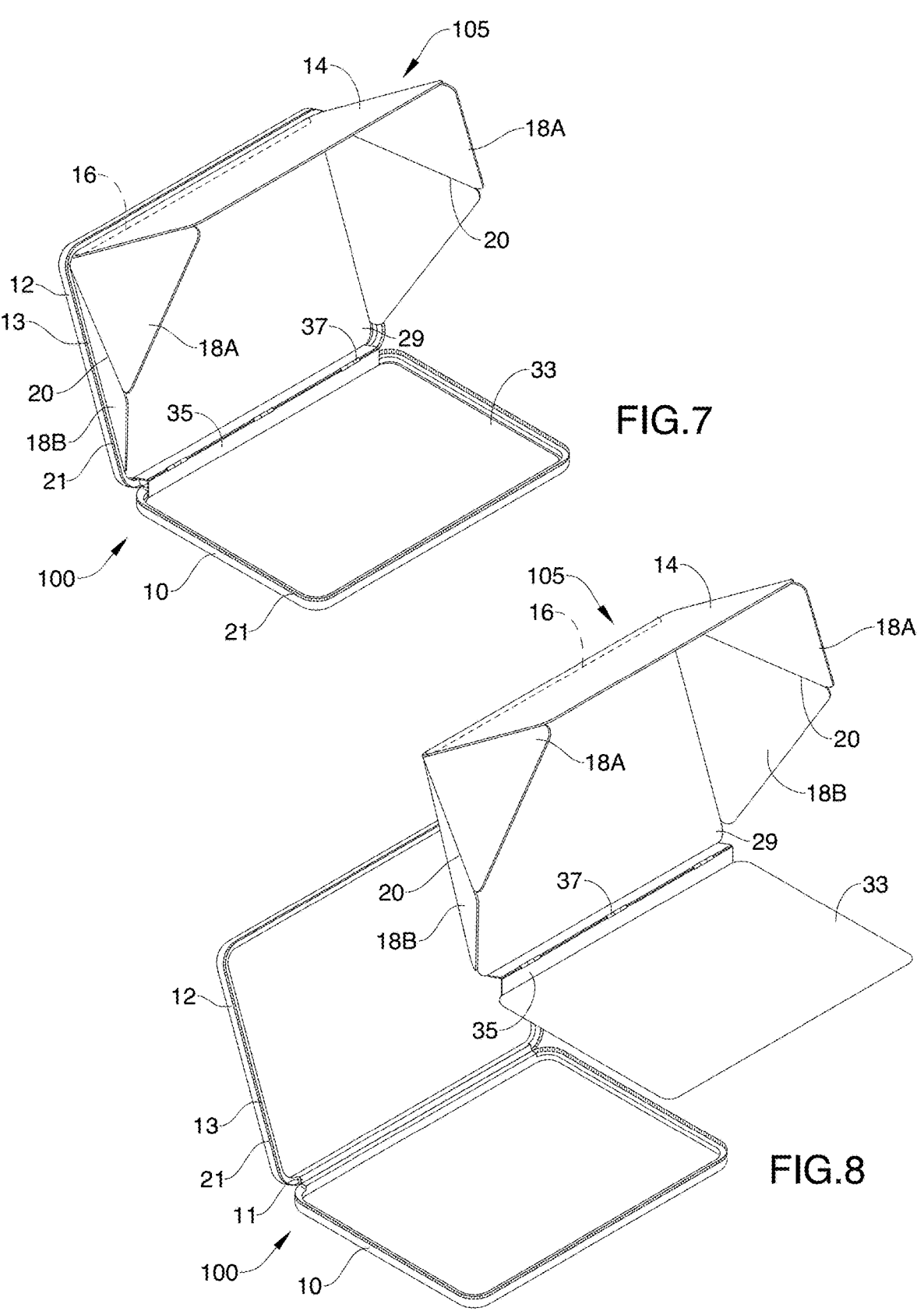
FIG. 7 is a perspective view of an embodiment of the present invention with the clamshell case shown in an open configuration wherein a laptop is removed, wherein the angle defined by the case lid and the base exceeds 90-degrees, and wherein the shade assembly is expanded. In this embodiment, the shade assembly comprises a visor panel, upper left side panel, lower left side panel, upper right side panel, and lower right side panel, bottom panel, and rear panel wherein the visor panel is connected to the rear panel via a hinge such as a friction hinge, the lower side panels are connected to the rear panel via a hinge such as a living hinge, and the rear panel is connected to a bottom panel via a hinge such as a friction hinge. The shade assembly is configured inside of the clamshell case with the rear panel of the shade assembly positioned within the inner surface of the case lid, while the bottom panel of the shade assembly is positioned within the base of the case.
FIG. 8 is an exploded view of the same embodiment of the present invention as shown in FIG. 7, wherein the shade assembly is shown outside of the clamshell case.
Figure 12:
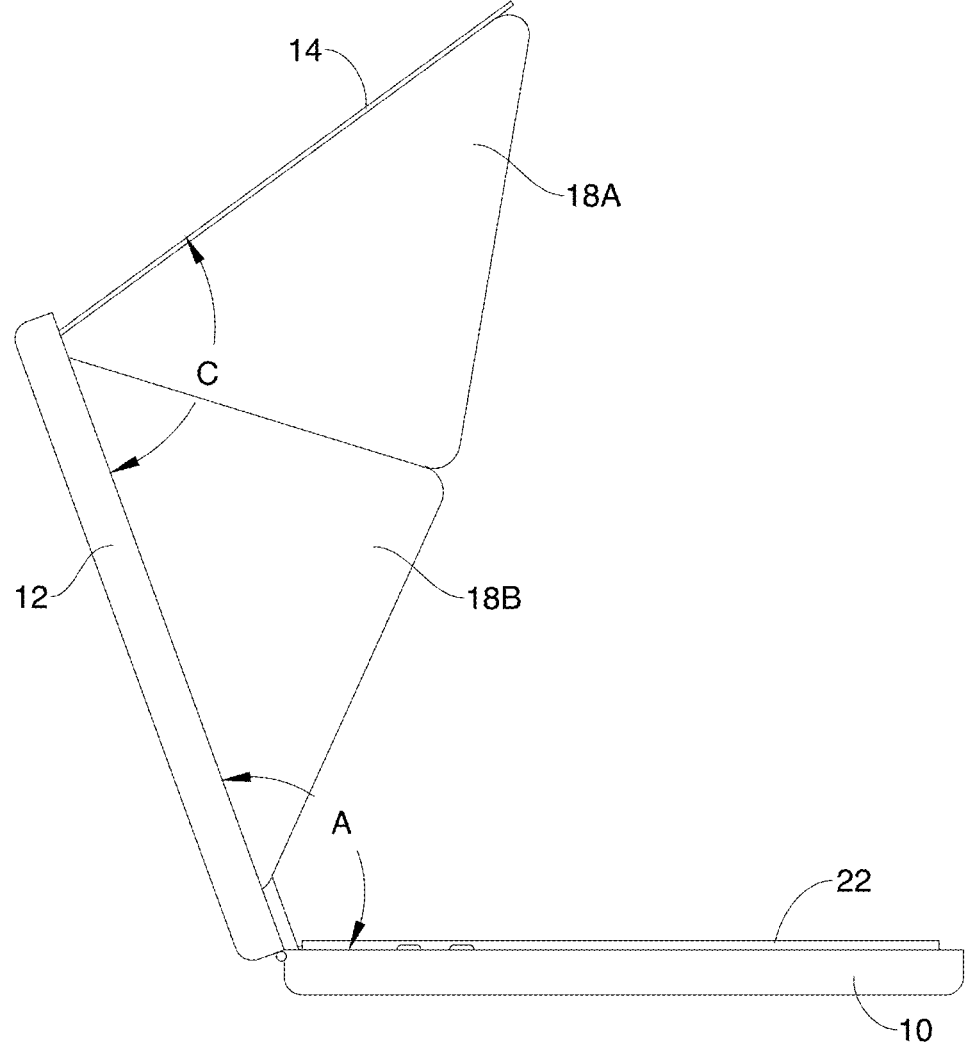
FIG. 12 is a side view of an embodiment of the present invention, with the clamshell case shown in an open configuration and shade assembly in its expanded position, wherein the angle defined by the case lid and the base exceeds 90-degrees.

The lid's upper front edge 15, left edge 13, and right edge 17 may perpendicularly extend from the lid 12 of the case 100 and come into contact with the base 10 of the case at its corresponding front edge 39, left edge 38, and right edge 40 when the case is transitioned from its open configuration to its closed configuration as shown in FIG. 6.

The left, right, and front edges may also contain fasteners such as, but not limited to a zipper 21, magnets, or latches for securely joining the case lid to the base when the case is in its closed configuration. When moving the case 100 from a closed position to an opened position, the case lid 12 and base 10 may be unfastened by either unzipping the joining edges of the two halves of the case, separating the two halves to release their magnetic attraction, or disengaging a locking mechanism such as a latch.

The lid 12 of the case is designed and dimensioned to store a monitor assembly 50 of a laptop 22, while the base 10 of the case is designed and dimensioned to store a keyboard assembly 52 of the laptop 22.

The lid 12 of the case and the base 10 of the case may be made of but not limited to EVA foam, TPU, or other materials suitable for a laptop case.

The laptop case 100 contains a shade assembly 105 which consists of at least a visor panel 14, an upper side panel 18A on the left side of the shade assembly 105, an upper side panel 18A on the right side of the shade assembly 105, a lower side panel 18B on the left side of the shade assembly 105, and a lower side panel 18B on the right side of the shade assembly 105.

In some embodiments shown in FIGS. 1-12, 14-15, 17, 20-21, and 23-24, the shade assembly 105 includes a rear panel 29 and lower panel 33 in addition to the visor panel 14 and the upper and lower side panels 18A-B. In this embodiment, the visor panel 14 may be pivotally connected to the rear panel 29 via an upper hinge 16 which may be a friction hinge or any other suitable hinge. The upper side panels 18A are permanently attached to the visor panel 14 on each the left and right sides, while the lower side panels 18B are permanently attached to the rear panel 29 on each the left and right sides. In this configuration, the visor panel 14 and lower side panels 18B are attached to the rear panel 29 of the shade assembly 105 which distinguishes this configuration from others where the panels are directly attached to the case lid 12. The rear panel 29 may be pivotally connected to the bottom panel 33 via a lower hinge 37, which may be a friction hinge or any other suitable hinge. This lower hinge 37 allows the angle defined between the rear panel 29 and the lower panel 33, as well as the angle formed by the lid 12 and the base 10 of the case to exceed 90-degrees when the case lid 12 is fully opened. In this embodiment the rear hinge 11 connecting the case lid 12 and the base 10 may be a living hinge since the weight of the visor panel 14 and side panels is largely supported by the hinges of the shade assembly: the upper hinge 16 and lower hinge 37. In this embodiment, the angle of the lid 12 to the base 10 can match the angle of the rear panel 29 to the lower panel 33, and is defined by the lower hinge 37 of the shade assembly 105, which may be, which may be a friction hinge or any other suitable hinge. The bottom panel 33 is configured within the interior surface of the case base 10, while the rear panel 29 is configured within the interior surface of the case lid 12.

In an alternative embodiment, the shade assembly includes a visor panel 14 and an upper side panel 18A and lower side panel 18B on each side of the shade assembly 105. In this embodiment, the upper side panels 18A are permanently attached to the visor panel 14 on each of the left and right sides, and the lower side panels 18B are permanently attached to the case lid 12 on each of the left and right sides, which is unique to this embodiment.

The panels of the shade assembly 105 may be laminated in polyurethane (PU), microfiber, a combination of both, or other suitable materials. In some embodiments, the outer side of the panels may be laminated in polyurethane or similar material to provide durability and resistance to external wear, while the inner side of the panel facing the user may be laminated in microfiber or similar material to offer a softer finish and reduce potential scratches to the laptop.

The connection between panels of the shade assembly may be formed by a living hinge (fabric hinge), the panels may be laminated with polyurethane or similar material on the outside and microfiber or similar material on the inside. The polyurethane and microfiber layers may be bonded together between the panels, creating a flexible, durable hinge that enables smooth movement and secure attachment.

The upper side panel 18A and the lower side panel 18B on each side of the shade assembly 105 may be connected together by a joining hinge 20, which may be a living hinge, friction hinge, piano hinge, or spring hinge. In the embodiment where this connection is formed by a living hinge (fabric hinge), the panels may be laminated with polyurethane or similar material on the outside and microfiber or similar material on the inside. The polyurethane and microfiber layers may be bonded together between the panels, creating a flexible, durable hinge that enables smooth movement and secure attachment. In an alternative embodiment, the upper side panel 18A and lower side panels 18B on each side of the case, when expanded, can self-lock in place using a locking hinge mechanism.

The upper side panel 18A on both the left and right sides of the shade assembly is connected directly to the visor panel 14. This connection may be formed by a living hinge (fabric hinge). In the embodiment where this connection is formed by a living hinge (fabric hinge), the panels may be laminated with polyurethane or similar material on the outside and microfiber or similar material on the inside. The polyurethane and microfiber layers are bonded together between the panels, creating a flexible, durable hinge that enables smooth movement and secure attachment.

In use, the case in it's closed configuration can be unfastened and the lid and base can pivot relative to each other traversing the lid to an Angle A defined by the lid 12 and the base 10; maintaining the Angle A of the lid 12 and the base 10 with a hinge that connects the lid 12 and the base 10.

Figures 2, 3:
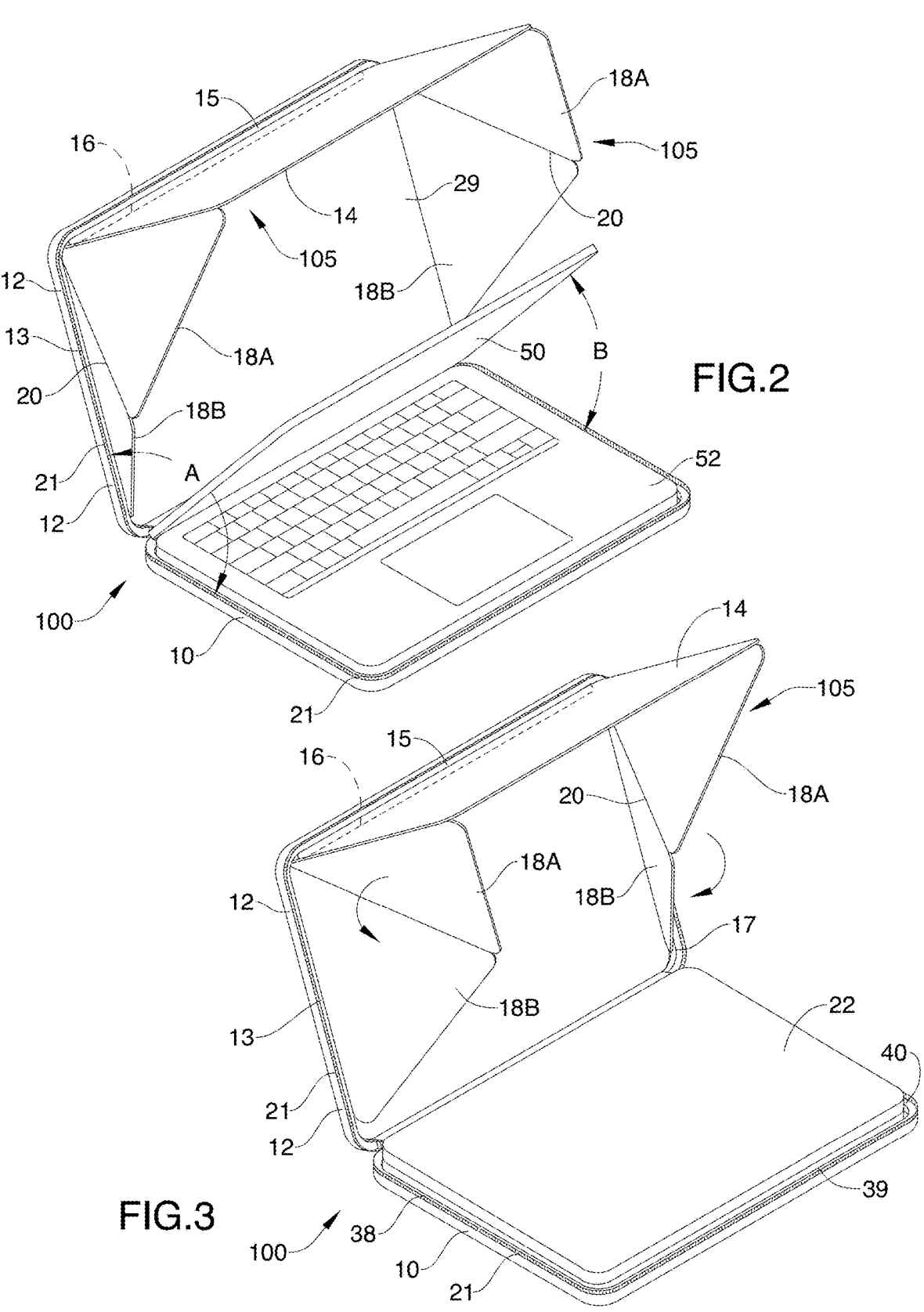
FIG. 2 is a perspective view of an embodiment of the present invention, with the clamshell case shown in an open configuration where the angle defined by the case lid and the base is greater than 90-degrees. The shade assembly is expanded, with a partially opened laptop placed within the case where the monitor is at an angle less than 90-degrees to the keyboard, at an independent angle less than the case lid.
FIG. 3 is a perspective view of an embodiment of the present invention, with the clamshell case in an open configuration with the shade assembly in a partially collapsed state, where the side panels on the left and right sides are collapsing inward. A laptop is fully closed within the case.

When the case is in its opened configuration, the shade assembly 105 can be expanded from its collapsed position by lifting the visor panel 14 upward as it rotates along an upper hinge 16 that connects the visor panel to the rear panel 29. The upper hinge 16 which may be a friction hinge or any other suitable hinge in order to fully support the weight of the visor panel 14. As the visor panel 14 of the shade assembly 105 is extended upward and outward over the base 10 of the case, the the upper side panels 18A and lower side panels 18B on the left and right sides of the shade assembly 105 simultaneously expanded from their collapsed or folded position in order to partially shield a laptop 22 contained within the open case 100 from direct sun exposure, providing an awning-like or hooded structure that shields the laptop from sunlight. In its fully extended position, the visor panel 14 is opened relative to the case lid 12 or rear panel 29 defined by Angle C. The shade assembly 105 must first be expanded before a laptop monitor 50 can be opened to an angle (Angle B) of 90-degrees or greater under visor panel 14 of the shade assembly. Once the shade assembly is fully expanded, the laptop monitor 50 can extend to an angle (Angle B) greater than 90-degrees to the keyboard 52 which may be independent from the angle (Angle A) of the case lid 12 to the base 10 as can be seen in FIG. 2. Angle A and Angle B can also be positioned at the same angle.

As shown in FIGS. 1-6, before collapsing the shade assembly, the monitor of a laptop positioned within the case must first be closed or sufficiently lowered to allow the panels of the shade assembly to collapse behind it. The visor panel 14 folds in a downward rotation along the upper hinge 16 by lowering the visor panel 14 while the upper and lower side panels 18A-B on each side simultaneously fold inward in a flattened position. The side panels 18A-B fold inward behind the visor panel 16. In the collapsed position, the folded shade assembly 105 can lay flat within the interior surface 31 of the case lid 12. In the embodiment which includes a rear panel 29 and a bottom panel 33 as part of the shade assembly 105 as shown in FIGS. 1-12, 14-15, 17, 20-21, and 23-24, when the shade assembly 105 is folded into the collapsed position, the visor panel 14 and the side panels fold inward along the rear panel 29 which is positioned inside the interior surface 31 of the case lid. In this embodiment, the bottom panel 33 remains inside the interior surface 31 of the base 10 of the case when the shade assembly 105 is in its fully collapsed position.

After collapsing the shade assembly 105 to its stowed position wherein the visor panel and side panels are fully collapsed and flattened, the case can be closed by traversing the lid 12 toward the base 10 to join the edges of the lid with the edges of the base, securing the the laptop 22 between the lid and the base. The lid may be optionally locked or the closed case may be zipped for secure storage or transport.

In some embodiments, the hinge plates of the lower hinge 37 of the shade assembly 105 may directly integrate within the panels as shown in FIGS. 9 and 10A-10B. In this embodiment the panels may be constructed of thin sheets of, but not limited to, FR4 wherein the hinge plates (also known as hinge leafs or hinge leaves) are sandwiched in between the sheets of material forming the panels. Alternatively, the hinge plates of the lower hinge 37 may be configured on the back side of the rear panel and the lower side of the lower panel without integrating within the panels. As shown in FIGS. 9 and 10B, a first hinge leaf includes a first support portion 37A configured to be positioned flush against the rear panel 29, and a second support portion 37B in a different plane relative to the first support portion 37A. These figures also show a second hinge leaf including a first support portion 37C configured to be positioned flush against the bottom panel 33, and a second support portion 37D positioned in a different plane relative to the first support portion 37C. These figures also show a hinge barrel 37E connecting the first and second hinge leafs.

As illustrated in FIGS. 1-12, 14-15, 17, 20-21, and 23-24, the plates of the lower hinge 37 may be covered with a hinge plate cover 35 which may be comprised of two, narrow, parallel, rectangular strips configured to cover the plates of a panel assembly lower hinge 37, wherein an upper strip of the hinge plate cover 35 can span across on the top of the hinge plates of the lower hinge 37 that are sandwiched into the rear panel 29, and a lower strip of the hinge plate cover 35 can span across the top of the hinge plates of the lower hinge 37 that are sandwiched into the bottom panel 33.

Figure 13:
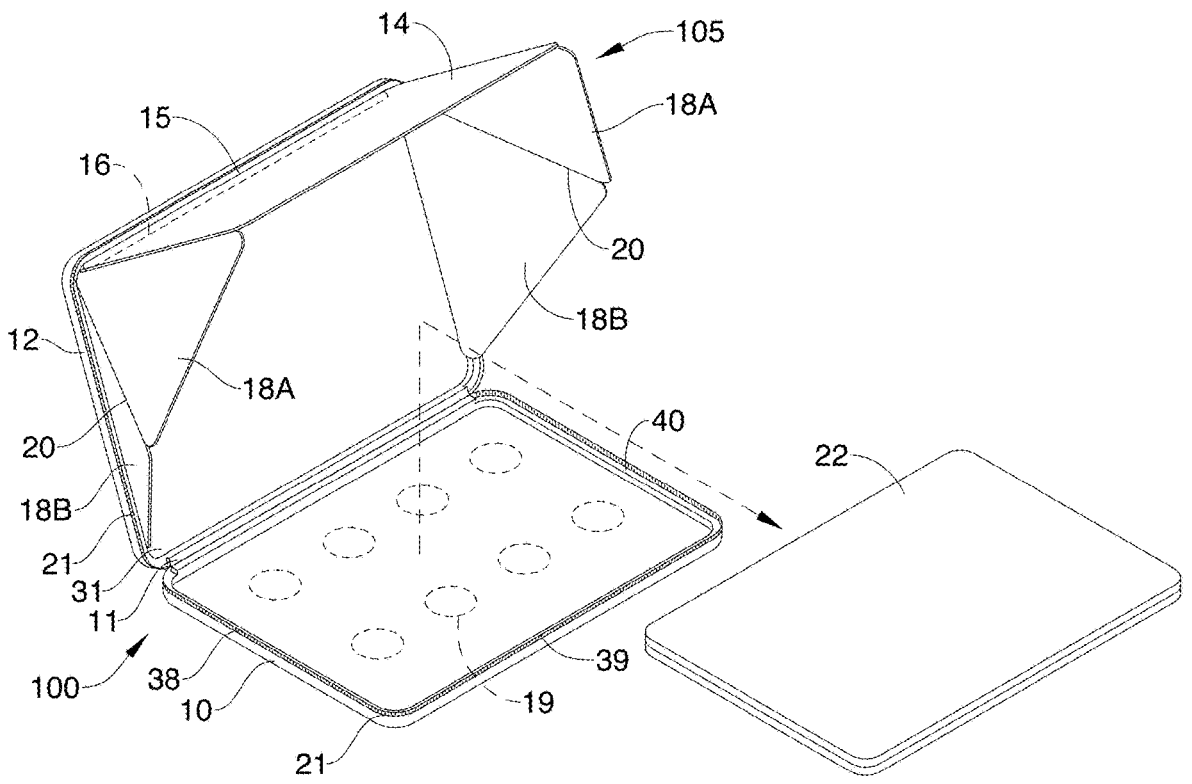
FIG. 13 is a perspective view of an embodiment of the present invention, with the clamshell case shown in an open configuration and the shade assembly in an expanded position wherein a closed laptop is removed and dashed lines are used to show the placement of embedded magnets in the base of the case.
Figures 14, 15:
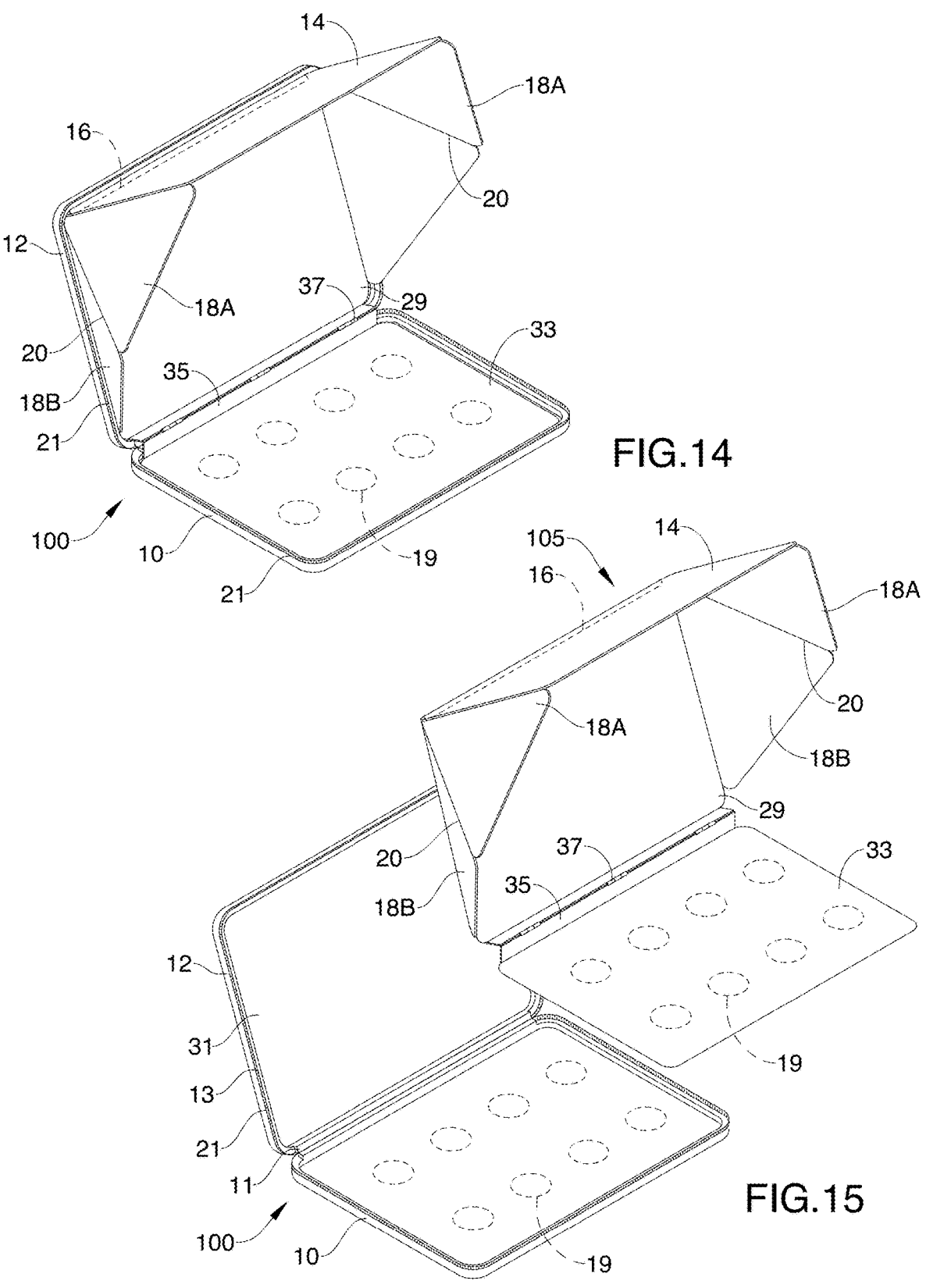
FIG. 14 is a perspective view of an embodiment of the present invention, with the clamshell case shown in an open configuration wherein a laptop is removed and dashed lines are used to show the placement of embedded magnets in the base half of the case. In this embodiment, the shade assembly comprises a visor panel, upper left side panel, lower left side panel, upper right side panel, and lower right side panel, bottom panel, and rear panel wherein the visor panel is connected to the rear panel via a hinge such as a friction hinge, the lower side panels are connected to the rear panel via a hinge such as a living hinge, and the rear panel is connected to a bottom panel via a hinge such as a friction hinge. The shade assembly is configured inside of the clamshell case with the rear panel of the shade assembly positioned within the inner surface of the case lid while the bottom panel of the shade assembly is positioned within the base of the case.
FIG. 15 shows an exploded perspective view of the same embodiment as FIG. 14 wherein the shade assembly is shown removed from the clamshell case.

As shown in FIGS. 13-15, in some embodiments of the present invention, the base 10 of the case 100 or the lower panel 33 of the shade assembly 105 may contain embedded magnets 19 which can be used to connect the shade assembly 105 to the base 10 of the case 105, or alternatively as a mechanism for securely connecting the base 10 to a mounting plate 32 in order to facilitate the connection to a stand 30, such as, but not limited to a tripod, as illustrated in FIGS. 22-25.

Figures 16, 17:
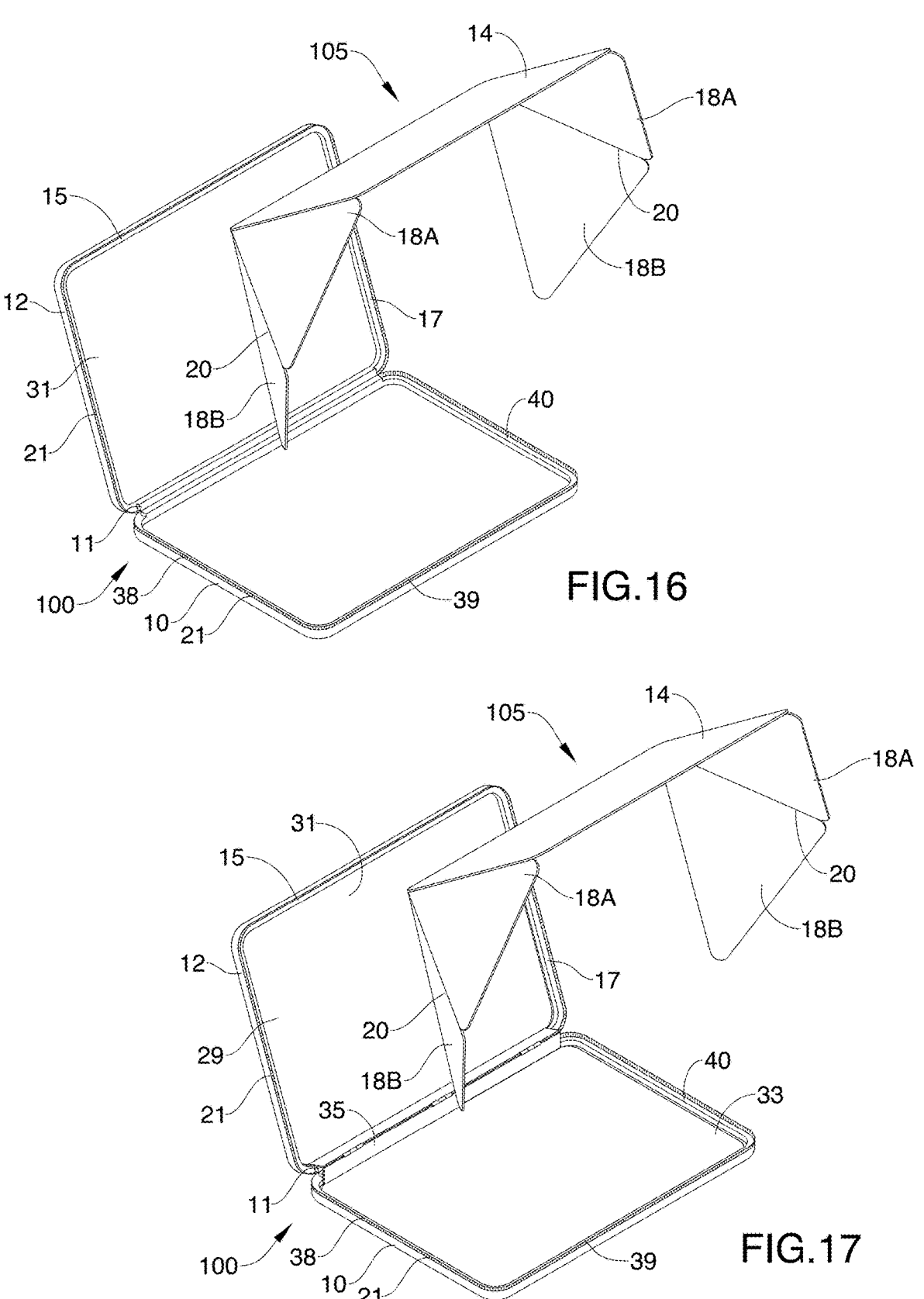
FIG. 16 is a perspective view of an embodiment of the present invention with the clamshell case shown in an open configuration wherein the shade assembly comprises a visor panel, upper left side panel, lower left side panel, upper right side panel, and lower right side panel and is shown detached from the lid half of the case.
FIG. 17 is a perspective view of an embodiment of the present invention with the clamshell case shown in an open configuration wherein the visor panel, upper left side panel, lower right side panel, upper left side panel, and lower right side panel are shown detached from the rear panel and base panel portions of the shade assembly and the lid half of the case.

As shown in FIGS. 16-17, in some embodiments of the present invention, the shade assembly 105 comprises a visor panel 14 and upper and lower side panels 18A-B on each side of the case wherein the shade assembly 105 may be attachable along an upper front edge 15 of the lid 12 of the case. In this embodiment, the shade assembly can be detached from the lid 12 of the case for interoperability. In this embodiment, the rear edges of the shade assembly 105 may connect to the rear panel 29 magnetically or via another secure attachment method.

Figures 18, 19:
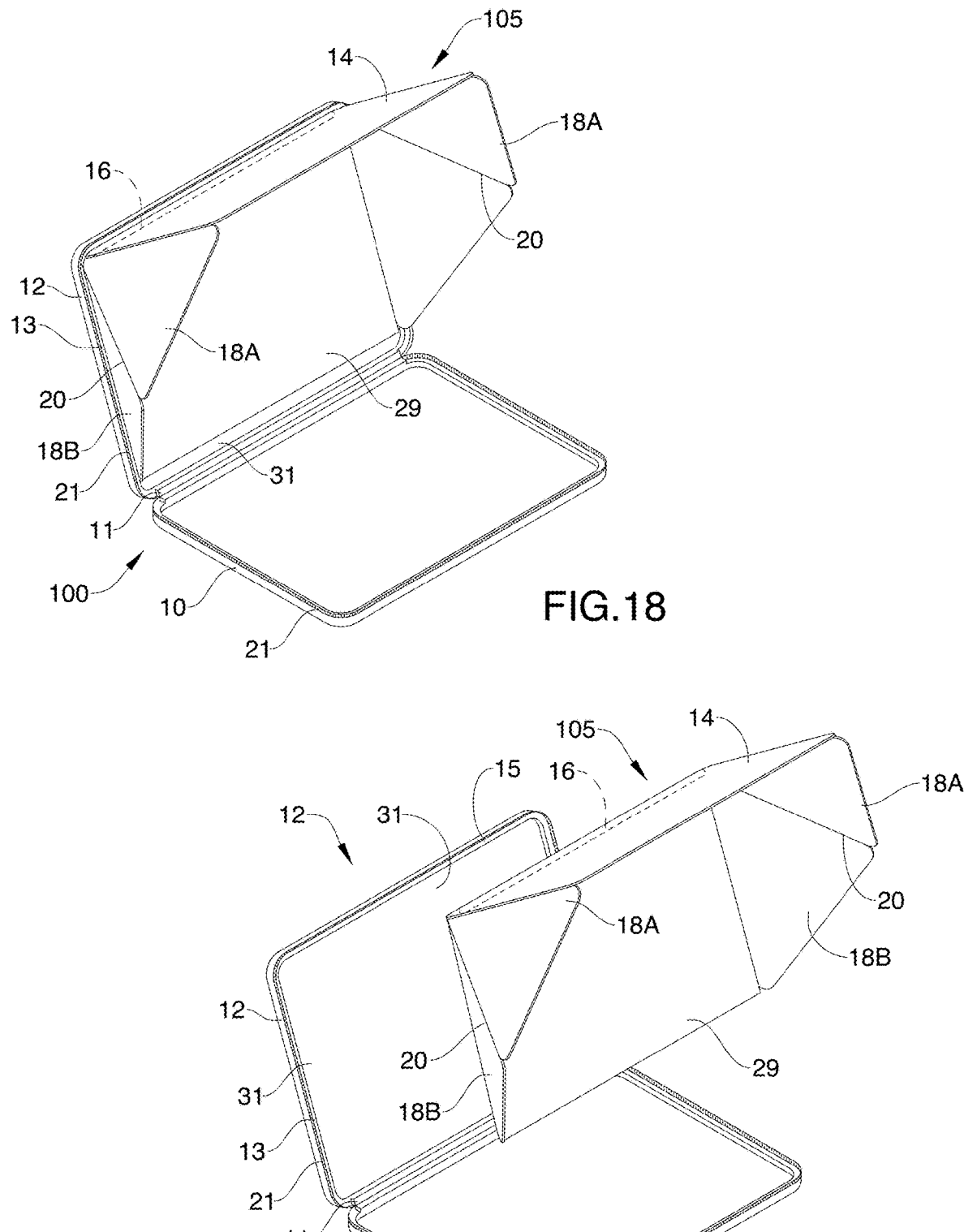
FIG. 18 is a perspective view of an embodiment of the present invention with the clamshell case shown in an open configuration wherein the shade assembly is shown attached to the lid of the case and wherein the shade assembly includes a rear panel.
FIG. 19 is a perspective view of an embodiment of the present invention shown in FIG. 18 with the clamshell case shown in an open configuration wherein the shade assembly is shown detached to the lid of the case and wherein the shade assembly includes a rear panel.

As shown in FIGS. 18-19, in some embodiments of the present invention, the shade assembly comprises a rear panel 29 in addition to the visor panel 29, and upper and lower side panels 18A-B on each side of the case, wherein the shade assembly 105 is detachable from the interior surface 31 of the case lid 12 for interoperability. In this embodiment, the back side of the rear panel 29 may contain ferromagnetic material which magnetically connects to the magnetizable material in order to provide the secure attachment to the interior surface 31 of the lid 12.

Figures 20, 21:
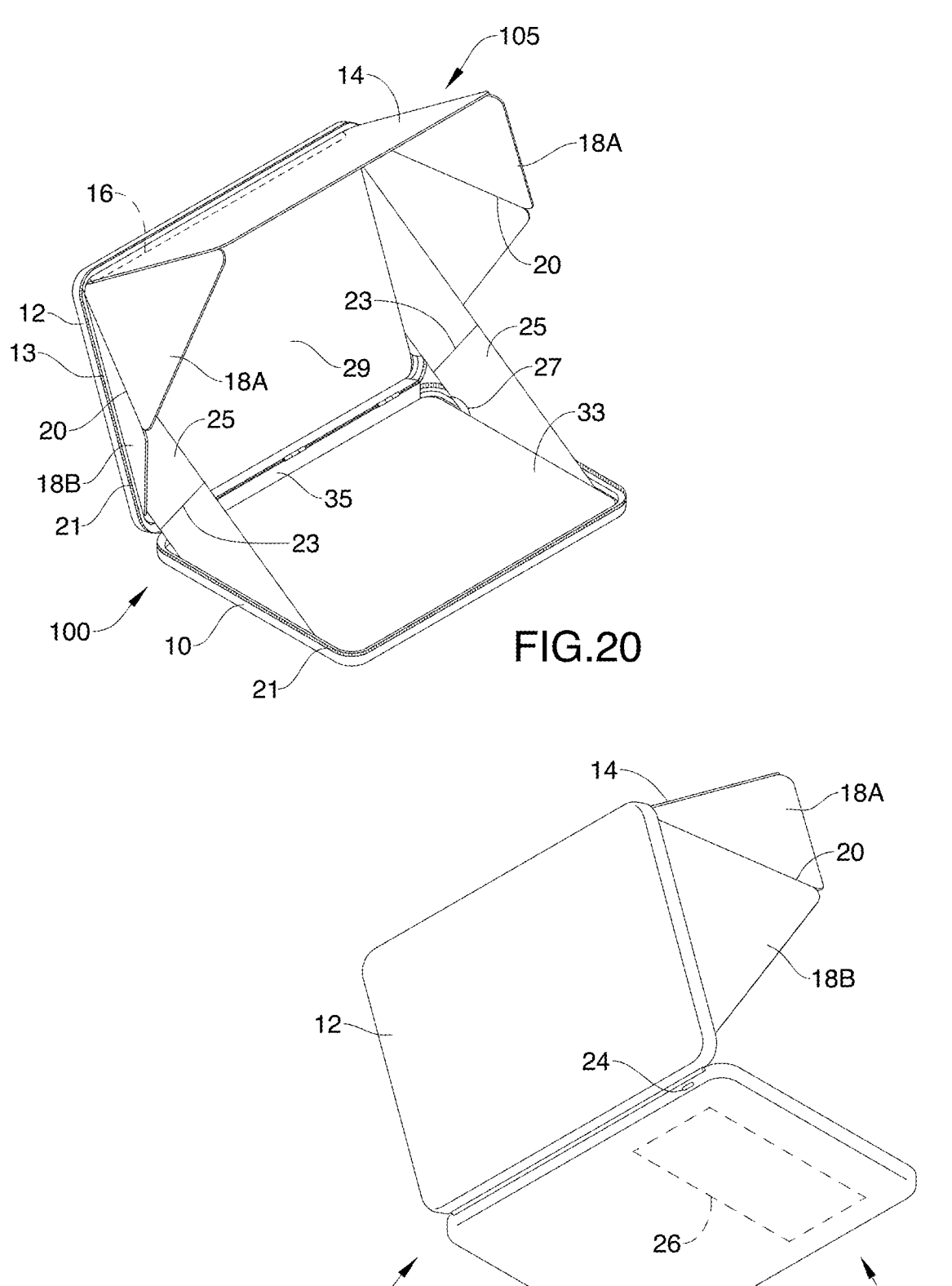
FIG. 20 is a perspective view of an embodiment of the present invention with the clamshell case shown in an open configuration where side gussets on each side of the case are attached to the lid of the case and the base of the case.
FIG. 21 is a perspective view of an embodiment of the present invention showing the bottom of the base of the case with an area in the base configured to house a battery and charging port interface.
Figure 22:
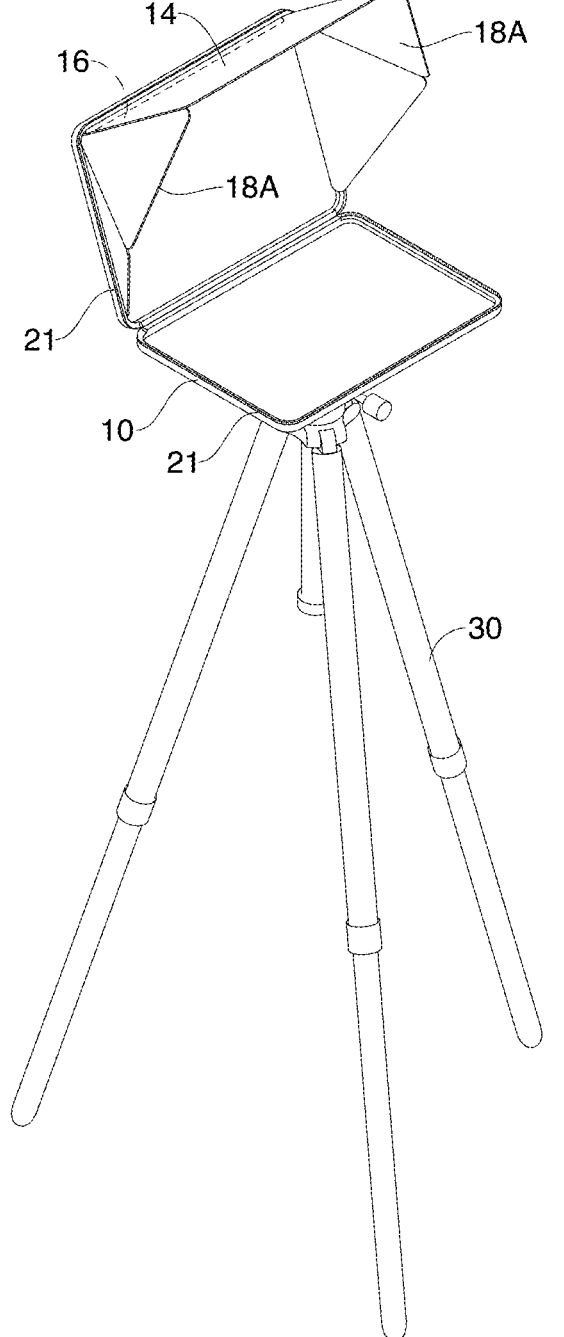
FIG. 22 is a perspective view of an embodiment of the present invention showing the case with foldable shade configured on a support such as a tripod.
Figures 23, 24, 25:
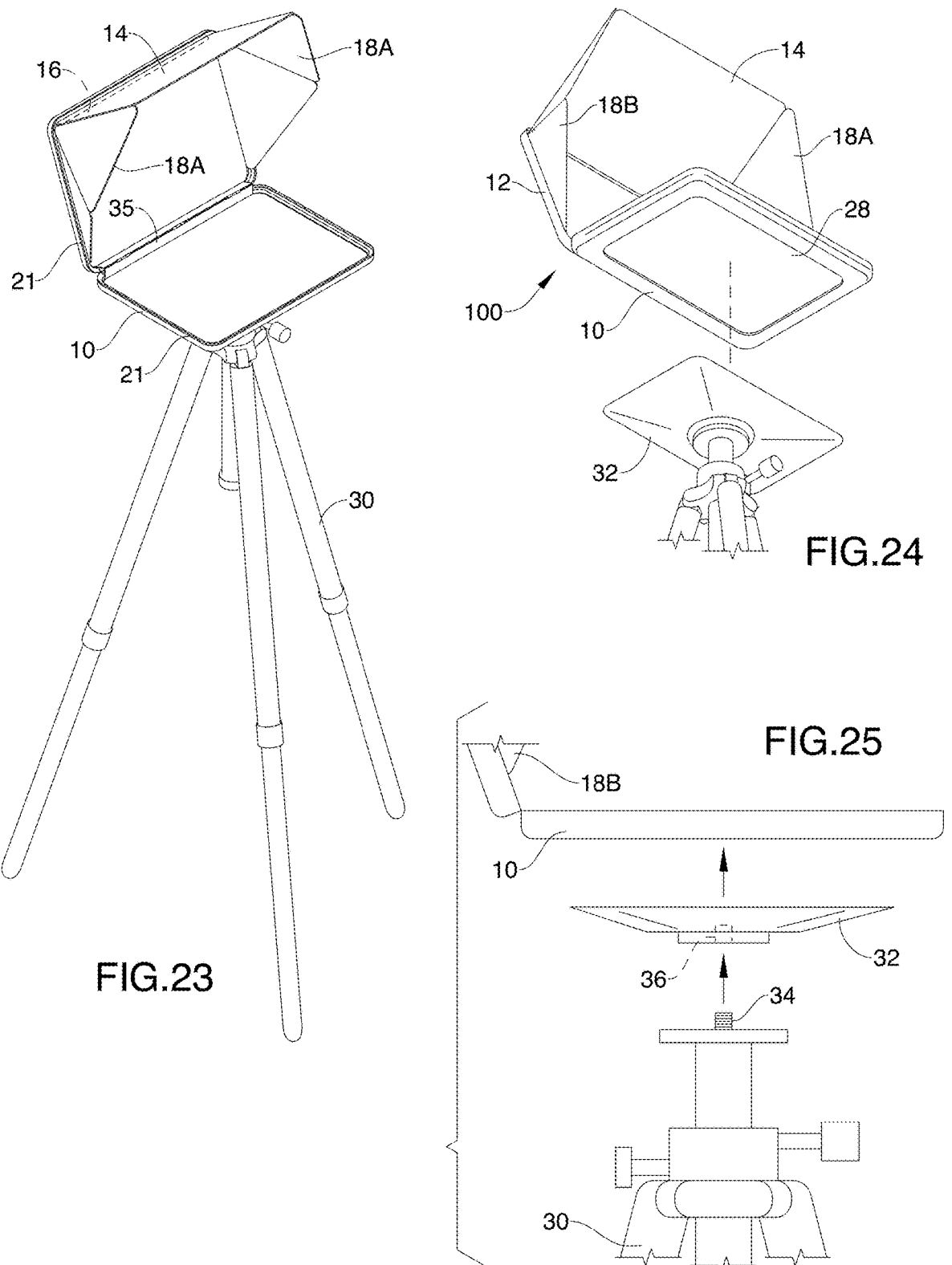
FIG. 23 is a perspective view of an embodiment of the present invention showing the case with foldable shade configured on a support such as a tripod. In this embodiment, the shade assembly comprises a visor panel, upper left side panel, lower left side panel, upper right side panel, and lower right side panel, bottom panel, and rear panel wherein the visor panel is connected to the rear panel via a hinge such as a friction hinge, the lower side panels are connected to the rear panel via a hinge such as a living hinge, and the rear panel is connected to a bottom panel via a hinge such as a friction hinge. The shade assembly is configured inside of the clamshell case with the rear panel of the shade assembly positioned within the inner surface of the case lid while the bottom panel of the shade assembly is positioned within the base of the case.
FIG. 24 is an exploded view of an embodiment of the present invention showing the case detached from the mounting plate for a tripod or stand and a recess on the bottom base half of the case to accept the mounting plate.
FIG. 25 is an exploded view of an embodiment of the present invention showing the base half of the case, mounting plate, screw or other attachment component, and tripod or stand.

As shown in FIG. 20 in some embodiments of the present invention, side gussets 25 on each side of the case interconnect the lid of the case to the base along their respective two side edge portions and further block the sun from the side angles. The two side gussets 25 may also help support the weight of the case lid 12 in its opened position. As the laptop case 100 is transitioned from an opened position to a closed position, the side gussets can fold inward along a defined fold line 23 at approximately its midpoint to facilitate it folding inward when the laptop case 100 is shifted to the closed configuration.

In some embodiments of the present invention, a cut-out area in each of the side gussets 25 may be configured for accommodating the passage of power cables. The cut-out area is located proximate to the rear end of the base of the case 100, allowing convenient access for threading power cables through the side gussets while maintaining a laptop 22 enclosed within the clamshell case 100 in its opened position.

As shown in FIG. 21, in some embodiments of the present invention, the laptop case 100 further comprises a battery area 26 in the base 10 of the case 100 configured to house a battery, with an charging port interface 24 on the exterior of the case 100 that provides a connection point for a battery.

As shown in FIGS. 22-25, in some embodiments of the present invention, the present invention contemplates a recess 28 along the bottom of the base 10 of the case 100. The recess 28 may be dimensioned and adapted to receive an upper portion of a mounting plate 32. A lower portion of the mounting plate 32 may provide a connection component 36 dimensioned and adapted to secure to a threaded shaft 34 along an upper portion of a support 30, such as a tripod or stand (for example, a four-legged stand) in order to create a portable or mobile desk experience shown specifically in FIGS. 22-23. In one embodiment of the present invention, there are magnets contained within the base 10 of the case 100 which are intended to magnetically attract a mounting plate 32 which can be positioned on a stand 30, such as but not limited to a tripod. In another embodiment of the present invention, the connection between the mounting plate 32 and a stand 30 may be made with a standard threading such as a ¼"-20 threaded screw or ⅜"-16 threaded screw. In another embodiment of the present invention, the connection between the mounting plate 32 and the stand 30 may be connected with a quick release system such as the Arca-Swiss Quick Release System.

As used in this application, the term "about" or "approximately" refers to a range of values within plus or minus 10% of the specified number. And the term "substantially" refers to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term "aligned" means parallel, substantially parallel, or forming an angle of less than 10 degrees. For purposes of this disclosure, the term "transverse" means perpendicular, substantially perpendicular, or forming an angle between 80 and 100 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affects the position of the other.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the disclosure and that modifications may be made without departing from the spirit and scope of the disclosure as set forth in the following claims.

The invention claimed is:

1. A laptop case and foldable shade assembly, comprising:
a clamshell case having a lid and a base, wherein the lid and the base are joined together along their adjacent rear edges; and
a shade assembly, comprising:
a visor panel;
a first upper side panel on the left side of the shade assembly;
a second upper side panel on the right side of the shade assembly;
a first lower side panel on the left side of the shade assembly;
a second lower side panel on the right side of the shade assembly;
a rear panel, and
a bottom panel;
wherein each upper side panel is attached to the visor panel;
wherein the visor panel is pivotally connected to the rear panel via a friction hinge that retains the visor panel in a position rotated with respect to the rear panel;

wherein the rear panel is pivotally connected to the bottom panel via a hinge;

wherein the shade assembly is configured to fit within the clamshell case with the shade assembly's bottom panel positioned along the interior surface of the base and the shade assembly's rear panel positioned along the interior surface of the case lid; and wherein the friction hinge connecting the rear and bottom panels comprises:

a first hinge leaf having a first support portion configured to be positioned flush against the rear panel, and a second support portion provided in a different plane relative the first support portion;

a second hinge leaf having a first support portion configured to be positioned flush against the bottom panel, and a second support portion provided in a different plane relative to the first support portion; and a hinge barrel connecting the first and second hinge leafs, the hinge barrel being coupled to the first hinge leaf adjacent to its second support portion and coupled to the second hinge leaf adjacent to its second support portion.

2. The laptop case and foldable shade assembly of claim 1, wherein each lower side panel is permanently attached to the rear panel by a living hinge.

3. The laptop case and foldable shade assembly of claim 1, wherein the shade assembly in its storage position comprises the upper and lower side panels and the visor panel folded inward with the side panels and visor panel positioned against the rear panel, which is configured on the interior surface of the case lid.

4. The laptop case and foldable shade assembly of claim 1, wherein the panels of the shade assembly are laminated with a first material on the outer side and a second material on the inner side of the panel.

5. The laptop case and foldable shade assembly of claim 1, wherein the panels of the shade assembly are laminated with a first material on the outer side and a second material on the inner side of the panel, and the hinges between the panels are formed by a bond of materials.

6. The laptop case and foldable shade assembly of claim 1, wherein the lid and base of the clamshell case are joined along their adjacent rear edges with a living hinge, and wherein the hinge connecting the rear and bottom panels of the shade assembly fits within the living hinge of the clamshell case.

7. The laptop case and foldable shade assembly of claim 1, further comprising magnets positioned around the edge portions of the lid of the case and of the base of the case for securely joining the lid to the base when the case is in the closed configuration.

8. The laptop case and foldable shade assembly of claim 1, wherein the shade assembly attaches to the clamshell case using magnets.

9. The laptop case and foldable shade assembly of claim 1, wherein the upper side panel and the lower side panel on each side of the case lid are connected by a joining hinge.

10. The laptop case and foldable shade assembly of claim 1, wherein when the clamshell case is opened, a length of the second support portion of the first hinge leaf is configured such that the lid of the clamshell case is positioned outside the perimeter of the base of the clamshell case.

11. The laptop case and foldable shade assembly of claim 1, further comprising two side gussets, each side gusset connecting the lid of the case to the base of the case along their respective two side edge portions so that as the clamshell case is brought to a closed configuration from an open configuration the two side gussets fold inward within the clamshell case.

12. The laptop case and foldable shade assembly of claim 1, further comprising:

a recess along a bottom surf ace of the base of the case; and a mounting plate dimensioned to be received in the recess.

13. The laptop case and foldable shade assembly of claim 1, further comprising magnets embedded in the base.

14. The laptop case and foldable shade assembly of claim 1, further comprising a built-in battery and charging port in the base of the case that provides a power source.

15. The laptop case and foldable shade assembly of claim 1, wherein the rear panel is pivotally connected to the bottom panel via a friction hinge configured to allow the rear panel to retain a position rotated beyond 90 degrees relative to the bottom panel.

16. A method of traversing a laptop and laptop case and foldable shade assembly of claim 1, the method comprising:

opening the clamshell case by pivoting the lid relative to the base case;

traversing the lid to a first angle defined by the lid and the base;

maintaining the angle of the lid and the base with the friction hinge that connects the rear panel and the lower panel;

traversing the shade assembly from a folded position to an extended position to provide shade to a laptop monitor and shield the laptop monitor from sunlight; and traversing the laptop monitor to a second angle defined by the laptop keyboard and the laptop monitor, wherein the second angle is matched to the first angle.

17. A method of traversing a laptop and laptop case and foldable shade assembly of claim 1, the method comprising:

opening the clamshell case by pivoting the lid relative to the base case;

traversing the lid to a first angle defined by the lid and the base;

maintaining the angle of the lid and the base with the friction hinge that connects the rear panel and the lower panel;

traversing the shade assembly from a folded position to an extended position to provide shade to a laptop monitor and shield the laptop monitor from sunlight; and traversing the laptop monitor to a second angle defined by the laptop keyboard and the laptop monitor, wherein the second angle is defined by the laptop keyboard and the laptop monitor.

18. A method of traversing the laptop case and foldable shade assembly of claim 1 from an opened position to a closed position, the method comprising:

traversing a laptop monitor toward the laptop keyboard;

traversing the shade assembly from an extended position, wherein the shade assembly provides shade to the laptop monitor and shields the laptop monitor from sunlight, to a folded position; and traversing the lid toward the base until it is in a closed position.

19. A laptop case and foldable shade assembly, comprising:

a clamshell case having a lid and a base, wherein the lid and the base are joined together along their adjacent rear edges; and a shade assembly, comprising:

a visor panel;

a first upper side panel on the left side of the shade assembly;

a second upper side panel on the right side of the shade assembly;

a first lower side panel on the left side of the shade assembly;

a second lower side panel on the right side of the shade assembly;

a rear panel, and a bottom panel;

wherein each upper side panel is attached to the visor panel;

wherein the visor panel is pivotally connected to the rear panel via a hinge;

wherein the rear panel is pivotally connected to the bottom panel via a friction hinge;

wherein the friction hinge connecting the rear and bottom panels comprises a first hinge leaf positioned between two sheets of material that form the rear panel, and a second hinge leaf positioned between two sheets of material that form the bottom panel, and a hinge barrel connecting the first and second hinge leafs; and wherein the shade assembly is configured to fit within the clamshell case with the shade assembly's bottom panel positioned along the interior surface of the base and the shade assembly's rear panel positioned along the interior surface of the case lid.

20. A laptop case and foldable shade assembly, comprising:

a clamshell case having a lid and a base, wherein the lid and the base are joined together along their adjacent rear edges; and a shade assembly, comprising:

a visor panel;

a first upper side panel on the left side of the shade assembly;

a second upper side panel on the right side of the shade assembly;

a first lower side panel on the left side of the shade assembly;

a second lower side panel on the right side of the shade assembly;

a rear panel, and a bottom panel;

wherein each upper side panel is attached to the visor panel;

wherein the visor panel is pivotally connected to the rear panel via a hinge;

wherein the rear panel is pivotally connected to the bottom panel via a hinge;

wherein the shade assembly is configured to include a collapsed configuration and an open configuration, wherein:

in the collapsed configuration, the shade assembly is configured such that:

the side panels are folded inward so that the upper and lower side panels are flattened against each other;

the visor panel is rotated downward and positioned along the folded side panels; and the collapsed side panels and visor panel are positioned flat against the surface of the rear panel; and in the open configuration, the shade assembly is configured such that the first upper side panel and first lower side panel are positioned in different planes relative to one another, and the second upper side panel and second lower side panel are positioned in different planes relative to one another.

* * * * *